Dec. 31, 1968   L. R. CONNELLY   3,419,122
FLUID COUPLING WITH FLOW CONTROL MEANS
Filed Sept. 12, 1966   Sheet 1 of 2

INVENTOR
LAVERN R. CONNELLY
BY Hoffman and Yount
ATTORNEYS

United States Patent Office 3,419,122
Patented Dec. 31, 1968

3,419,122
FLUID COUPLING WITH FLOW
CONTROL MEANS
Lavern R. Connelly, Marshall, Mich., assignor to Eaton
Yale & Towne Inc., Cleveland, Ohio, a corporation of
Ohio
Filed Sept. 12, 1966, Ser. No. 578,667
8 Claims. (Cl. 192—58)

ABSTRACT OF THE DISCLOSURE

Disclosed herein is a fluid coupling including an input member mounted for rotation within an output member. A reservoir is formed within the input member to hold a fluid shear medium. Valve means is mounted on the input member for controlling a flow of the fluid shear medium between the reservoir and a shear space between the input and output members in response to a condition within the reservoir.AButment members are provided for regulating a flow of the fluid medium from the shear space to the reservoir in response to a condition within the shear space.

---

The present invention relates to fluid couplings of the type embodying a fluid shear medium for transmitting torque between relatively rotatable input and output coupling members, and particularly to a shear-type fluid coupling wherein the volume of fluid medium transmitting torque between the rotatable coupling members can be varied to change the speed of rotation of the output member.

A principal object of the present invention is to provide a new, improved, simple, compact and highly reliable viscous fluid coupling of the aforementioned character wherein the volume of the fluid shear medium acting between the coupling members can be varied so as to vary the speed of the output member.

Another object of the present invention is the provision of a new and improved shear-type fluid coupling having rotatable input and output coupling members defining a shear space therebetween and wherein the volume of fluid in the shear space transmitting torque between the input and output coupling members is controlled by a valve member mounted on the input coupling member.

A further object of the present invention is the provision of a new and improved fluid coupling, as noted in the next preceding paragraph, wherein the input coupling member has an axially extending passageway therein and the valve member is movable axially relative to the passageway to control flow of fluid through the passageway.

Still another object of the present invention is the provision of a new and improved shear-type fluid coupling having input and output coupling members defining a shear space therebetween and a valve member movable in a predetermined direction to control flow of fluid in the shear space and wherein the valve member is moved in the predetermined direction by both internal and external temperature sensing means.

Still another object of the present invention is the provision of a new and improved fluid shear coupling including input and output coupling members defining a shear space therebetween and having a wiper member carried by the input coupling member and which is operable to effect flow of fluid from the shear space to a reservoir chamber.

A still further object of the present invention is the provision of a new improved shear-type fluid coupling having rotatable input and output coupling members and wherein an abutment member is mounted on the outer periphery of one of the coupling members and is movable radially outwardly in response to a decrease in temperature to effect flow of fluid adjacent thereto into a reservoir chamber.

Further objects, novel characteristics, and advantages of the present invention will become apparent from the following detailed description of a preferred embodiment of the present invention made with reference to the accompanying drawings forming a part of this specification and in which.

Figure 2:
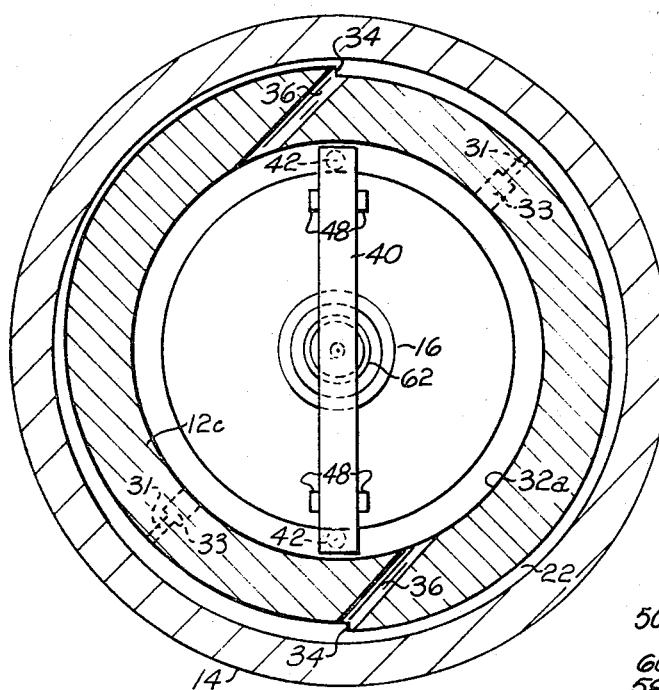
FIG. 2 is a sectional view taken substantially along line 2—2 of FIG. 1.

The present invention provides, in general, a fluid coupling wherein a viscous shear fluid medium cooperates with relatively rotatable input and output coupling members to transmit torque therebetween and wherein the volume of the fluid medium cooperating with the input and output members can be varied to vary the torque transmitted to the output member. A coupling embodying the present invention can be used to drive any type of mechanism, such as a fan, for example. It is to be understood, however, that the novel construction of the preferred embodiment of the present invention is not limited to any particular use.

As representing a preferred embodiment of the present invention, a fluid coupling 10 is shown in the drawings for driving a fan, not shown. The fluid coupling 10 includes an input or driving coupling member 12 and an output or driven coupling member 14. The input coupling member 12 is journaled on an end of a drive shaft 16. The drive shaft 16 may be driven from any suitable power source such as from an internal combustion engine of an automobile or the like. The input coupling member 12 is generally disc-shaped and is secured to drive shaft 16 by flaring out the end of shaft 16 on which the input coupling member 12 is mounted. Rotation of drive shaft 16 imparts rotation to the input or driving coupling member 12.

The output or driven coupling member 14 is adapted to be driven by the input coupling member 12 through a fluid shear medium therebetween. The output coupling member 14 is mounted for rotation relative to the input coupling member and relative to the drive shaft 16. The output coupling member 14 is rotatably supported on an intermediate portion 16b of drive shaft 16 by a ball bearing assembly 18. The mounting arrangement for the input and output coupling members forms a fluid seal at the right-hand end of the fluid coupling 10 as viewed in FIG. 1, to prevent fluid leakage thereabout.

The output coupling member 14 encases the input coupling member 12. In the preferred embodiment, fan blades are adapted to be connected to the output coupling member 14 by suitable fasteners threaded into threaded openings 20. The output coupling member 14 has a recessed interior defining a working chamber 22 and within which the input coupling member 12 is disposed. The operating chamber 22 is closed at the side thereof opposite bearing assembly 18 by a closure plate 24. The closure plate 24 is secured in an annular groove 25 provided in the output coupling member 14 and is sealed to prevent fluid leakage thereabout. The operating chamber 22 is a substantially fluid tight compartment within which the input coupling member 12 rotates. Torque is transmitted between the coupling members through a fluid shear medium disposed between the coupling members in a well known manner.

To facilitate the transmission of torque between the input and output coupling members, the coupling members have spaced opposed interdigitated lands and grooves 27 defining spaced opposed shear surfaces 26, 28 which define therebetween a shear space 30. As shear surface 26 rotates, it imparts a force to the fluid in the shear space 30 which in turn transmits the force to shear surface 28 on the output coupling member causing the output coupling member to rotate. The torque transmitted from the input coupling member 12 to the output coupling member 14 is a function of the volume of fluid in the working chamber 22, and specifically, in the above mentioned shear space 30. A pair of radially extending openings 31 in the input coupling member 12 communicating with a pair of U-shaped grooves 33 formed in the lands of the input coupling member provides for flow of fluid between the part of shear space 30 adjacent the periphery of the input coupling member and the part of the shear space 30 between the land and grooves 27.

It should be apparent that if there is no fluid in the working chamber 22 and consequently no fluid in the shear space 30, no torque would be transmitted between the input and output members, and as the fluid volume in the shear space 30 increases, the torque transmitted between the input and output members increases and the speed differential between the members is decreased.

The input coupling member 12 is generally disc-shaped and includes a hub portion 12a connected to the drive shaft 16 and intermediate body portion 12b extending from hub 12a and a peripheral portion 12c carrying lands and grooves 27 and a flange portion 12d. The input coupling member defines in part a fluid reservoir 32. The fluid reservoir 32 is defined by an annular groove 32a formed in the intermediate portion 12b of the input coupling member 12.

The fluid coupling 10 includes a first flow control means for removing fluid from the working chamber 22 and directing same into the reservoir 32. The first flow control means includes a pair of fixed abutments or wipers 34 on the periphery of the peripheral section 12c of the input coupling member 12. A pair of radially extending passageways 36 cooperate with wipers 34 to direct fluid into the reservoir 32. The passageways 36 communicate at their innermost ends with the fluid reservoir 32 and at their outermost ends with the working chamber 22. When the input coupling member 12 is rotating relative to the output coupling member 14, the wipers 34 force fluid to move, therewith creating a pressure adjacent the inlet ends of passageways 36. The fluid under pressure is thus directed through passageways 36 into the fluid reservoir 32. The abutments or wipers 34 and passageways 36 are of such a size and arrangement to direct a particular amount of fluid into the reservoir thereby providing a predetermined volume of fluid in the shear space 30 for a given relative speed of rotation between the input and output coupling members. The predetermined volume of fluid in shear space 30 maintains the output coupling member 30 rotating at its "idle" speed.

The present invention further provides a second flow control means which is operable to selectively increase the speed of the output coupling member by increasing the volume of fluid in shear space 30. The second flow control means includes a valve member 40 on the input coupling member which is operable to provide for the flow of fluid from the fluid reservoir 32 into the working chamber 22 and into the shear space 30. The valve 40 opens and closes a pair of axially extending openings or dump holes 42 in the intermediate portion 12b of the input coupling member 12. Each opening 42 communicates at one end with the fluid reservoir 32 and communicates at the opposite end with the working chamber 22 adjacent to the shear space 30.

Figure 3:
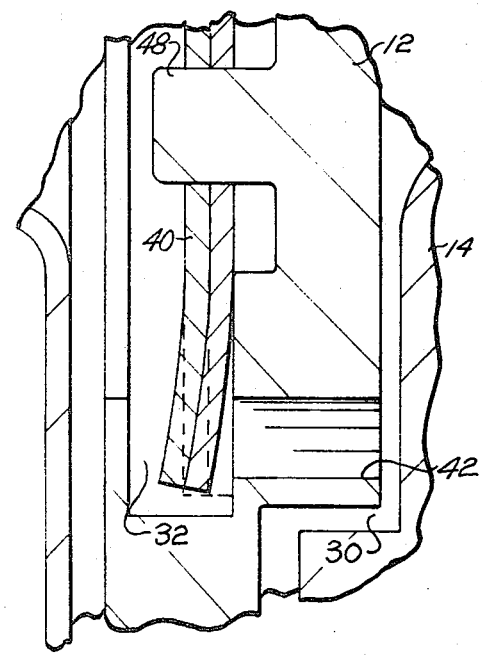
FIG. 3 is a fragmentary sectional view of a portion of the fluid coupling shown in FIG. 1 on an enlarged scale.

Fluid flow through openings 42 is controlled by the valve member 40. The valve member 40 is an elongated by-metal member which has the opposite ends thereof disposed adjacent to and at a location to cover one of the ends of the passageways 42. The ends of the bi-metal valve member 40 extend into the fluid reservoir 32 and are exposed to the fluid therein. The valve member 40 is supported for general axial movement between two pairs of lugs 48. The lugs 48 extend axially outwardly from the intermediate portion 12b of the input coupling member 12 and support the valve member 40 for movement between open and closed positions. The open position of valve 40 is illustrated in solid lines in FIG. 3. The valve member 40 when in its open position is spaced from openings 42 so that fluid is permitted to flow from the reservoir 32 through the axial openings 42 into the shear space 30, thus increasing the volume of fluid in the shear space and the torque transmitted. The closed position of valve 40 is illustrated in the broken line position in FIG. 3 and wherein the valve member 40 covers the openings 42 and fluid flow through openings 42 is blocked.

The valve member 40 is moved to the open position in response to a predetermined increase in the temperature of the fluid in the fluid reservoir 32. When the temperature of the fluid in the reservoir 32 exceeds a predetermined value, the different coefficient of expansions of the metal selected for the bi-metal member 40 expand differentially and cause the end portions of the valve member 42 to bend away from the passageways 42 opening the passageways and permitting fluid to flow into the shear space. By this arrangement, the speed of the fan or other mechanisms driven by the output coupling member 14 is increased when the temperature in the coupling exceeds a predetermined value as reflected by the temperature of the fluid in the reservoir 32. When the temperature of the fluid in the reservoir 32 drops below the predetermined value, the different coefficient of expansion of the metals in the bi-metal member 40 move or bend in a generally axial direction toward the openings 42 into the closed position blocking flow into the chamber 32. When the valve 40 is closed, the first flow control means including pumping abutments 34 and passageways 36 operate to reduce the increased fluid volume in working chamber 22 and establishes a lower volume of fluid in the shear space 30 and the speed of the output member 14 is accordingly reduced to the "idle" speed.

The valve member 40 is also operable in response to changes in temperature ambient to the exterior of the output coupling member 14. The valve member 40 is moved to open and closed positions by an external temperature responsive valve actuator means 50. The external temperature responsive valve actuator means 50 is supported on the closure plate 24 of the output coupling member 14 and is exposed to the air around the coupling 10. The exterior valve actuator means 50 includes an elongated bi-metal member 52 fixed at one end to an axially protruding hub 24a in the closure plate member 24 by a suitable fastener 54. The opposite end of the bi-metal member 52 is guided for movement in an L-shaped bracket 56. The bracket 56 is fixed to the plate 24 and has an opening in the horizontally extending portion thereof which receives the end of the member 52 and permits the member 52 to move relative thereto within defined limits.

A motion transmitting member 58 transmits movement of bi-metal member 52 to the valve member 40. The transmitting member comprises a pin 58 projecting through an opening 60 provided in the plate 24 and has sufficient clearance to permit axial movement thereof relative to the plate 24. The pin 58 has one end 58a in abutment with an intermediate portion of the bi-metal member 52. The opposite end 58b of pin 58 extends into the working chamber 22 and abuts the bi-metal valve member 40 at a location on the axis of rotation of the drive shaft 16. The pin 58 is also disposed coaxial with a coil spring 62 which biases the bi-metal valve member 40 toward the end 58b of the motion transmitting member 58. The spring 62 is mounted in a recess provided in the inward end of drive shaft 16 and acts between the drive shaft 16 and the bi-metal valve member 40.

Figure 1:
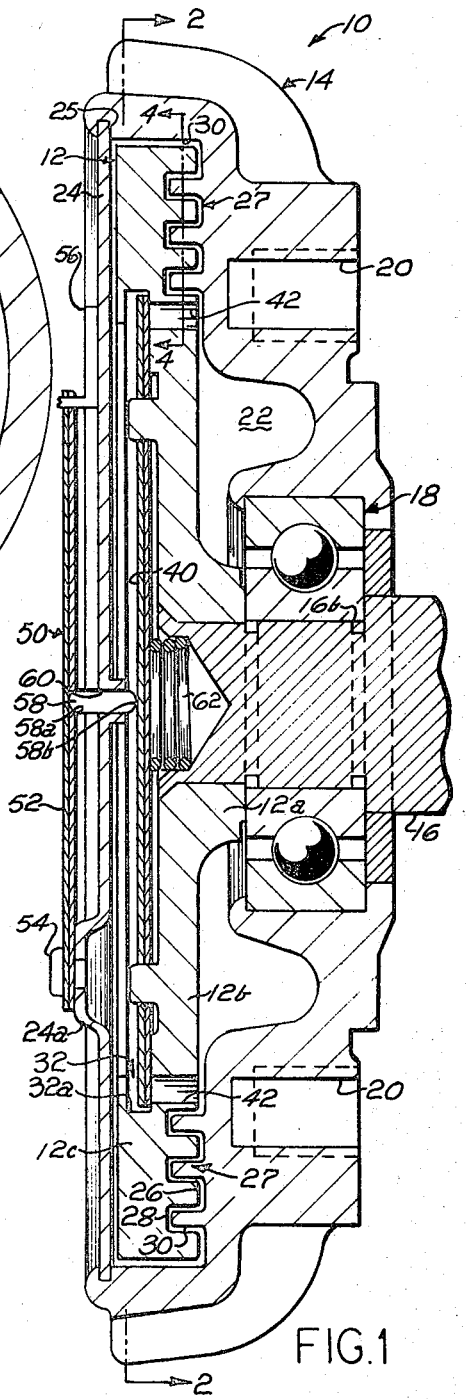
FIG. 1 is an axial sectional view of a fluid coupling embodying the present invention.

When the temperature ambient to the bi-metal member 52 exceeds a predetermined value, the bi-metal member 52 moves toward the plate 24, moving the motion transmitting member or pin 58 axially to the right as viewed in FIG. 1. The movement of pin 58 increases the force exerted thereby on the valve member 40 and moves the middle part of valve member 40 to the right against spring 62 and the ends of the valve member 40 moves to the left to their open position illustrated by the full line showing in FIG. 3 and permits fluid to flow through the openings 42 into the shear space 30. When the temperature ambient to bi-metal strip 52 is below the predetermined value, the member 52 moves to the left, as viewed in FIG. 1, and spring 62 moves the pin member 58 and the valve member 40 to their respective positions illustrated in FIG. 1. In this position, the valve member 40 closes the fluid passageways 42 preventing fluid from flowing from the reservoir 32 into the shear space 30.

The temperature responsive external valve actuator 50 operates independently of the bi-metal valve member 40 and provides a separate control for moving the valve member 40 between its open and closed positions. On the other hand, the valve member 40 can move between its open and closed positions independently of the external valve actuator means 50.

Figure 5:
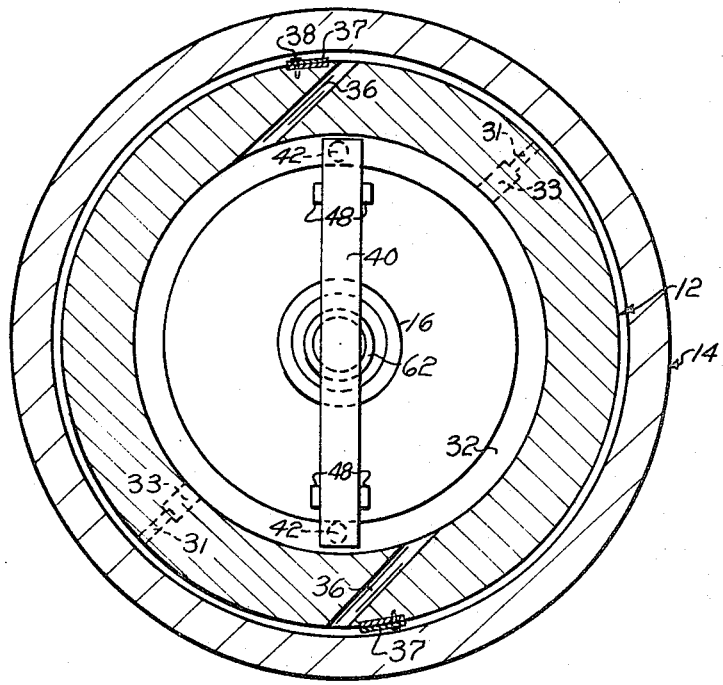
FIG. 5 is a view similar to FIG. 2 but illustrating a modified fluid coupling.
Figure 4:
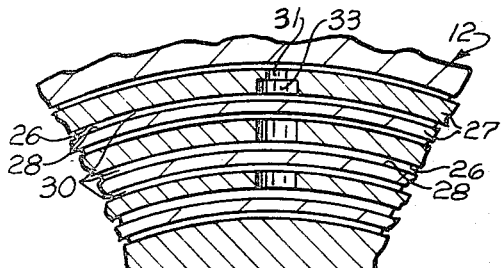
FIG. 4 is a fragmentary sectional view of the fluid coupling of FIG. 1 taken approximately along section line 4—4 thereof.
Figure 6:
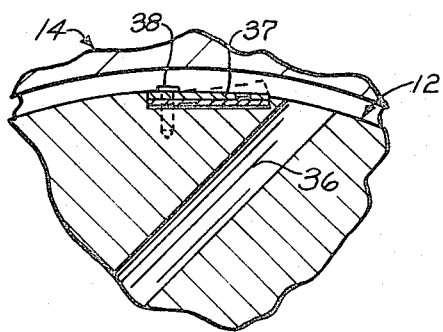
FIG. 6 is an enlarged fragmentary view of the coupling of FIG. 5.

The present invention further provides a modified arrangement for removing fluid from the working chamber 22 and directing it into the reservoir 32. The modified arrangement is shown in FIGS. 5 and 6 and operates to reduce fluid volume in shear space 30 by establishing flow of fluid through passageways 36 into reservoir 32 when torque to be transmitted between the coupling members is to be reduced. The modified arrangement includes a pair of movable bi-metal abutments or wiper members 37. The bi-metal wiper members 37 are temperature responsive and mounted in recesses in the periphery of the input coupling member by suitable fasteners 38. The bi-metal wipers 37 move in a generally radial direction between maximum and minimum radial positions represented by the broken and full line positions, respectively, in FIG. 6. The wiper members 37 move to the maximum radial position in response to a decrease in temperature ambient thereto. Such a condition would exist, for example, when the fan or other mechanism being driven by the output coupling member does not have to be driven at a fast speed and consequently the fluid volume in the shear space should be reduced to establish an "idle" condition of operation of the fan. When the wiper members are in their maximum radial position, they present a greater area which engages the fluid and creates an increased pressure on the fluid at the inlet end of passageways 36. The fluid is thus directed into reservoir 32 through passageways 36.

The wiper members 37 move to their minimum radial positions in response to an increase in the temperature ambient thereto. Such a condition would exist, for example, at high ambient temperatures when the output coupling member is to be driven at an increased speed. The increased speed is provided by increasing the fluid volume in the shear space 30 which in turn increases the torque transmitted between the coupling members. When the wiper members are in their minimum radial positions, they are seated in their associated recess and only a small impact area protrudes above the periphery of the input coupling member.

From the foregoing it should be apparent that the present invention provides a fluid coupling which is operable to transmit torque between input and output coupling members and that the torque transmitted therebetween can be controlled by controlling the volume of fluid in the shear space between the coupling members. The fluid volume in the shear space is regulated by a valve member which is operated to selectively increase the volume of fluid in the shear space in response to the temperature of the fluid in the fluid reservoir and/or in response to the temperature ambient to the exterior of the fluid coupling. Hence, a dual temperature control is provided to drive the fan or other mechanisms connected to the output coupling member 14 at an increased speed when the temperature internally and/or externally of the fluid coupling 10 exceeds a predetermined value. The invention further provides a temperature responsive pumping member which cooperates with the valve means to establish minimum and maximum evacuation of fluid from the working chamber when maximum and minimum torque is to be transmitted between the coupling members, respectively.

Although preferred embodiment of the present invention have been described in considerable detail, certain modifications, changes and adaptations may be made therein by those skilled in the art to which the invention relates and it is hereby intended to cover all modifications, changes and adaptations thereof falling within the scope of the appended claims.

Having described my invention, I claim:

1. A fluid coupling comprising rotatable input and output coupling members, one of said coupling members defining a working chamber in which the other of said coupling members is rotatable, said other coupling member defining a reservoir for holding a fluid shear medium, said coupling members having spaced apart opposed surfaces defining therebetween a shear space and cooperable with fluid shear medium in said shear space to provide a fluid shear-type drive between said coupling members, conduit means for connecting said reservoir in fluid communication with said shear space, a bi-metallic member mounted on said other coupling member and located at least partially within said reservoir for regulating a flow of fluid shear medium from said reservoir through said conduit means to said shear space in response to a condition in said reservoir, passage means extending between an outer surface of said other coupling member and said reservoir for further connecting said reservoir in fluid communication with said shear space, and flow directing means for at least partially regulating a flow of fluid shear medium from said shear space through said passage means to said reservoir, said flow directing means including bi-metallic means movable in a generally radial direction relative to said other coupling member for directing fluid from said shear space into said passage means, said bi-metallic means being responsive to a condition in said shear space to regulate the flow of fluid through said passage means as a function of said condition in said shear space.

2. A fluid coupling as set forth in claim 1 further including bi-metallic actuator means mounted on said one coupling member for operating said bi-metallic member in response to a condition exteriorly of said fluid coupling.

3. A fluid coupling as set forth in claim 1 wherein said conduit means includes a pair of substantially diametrically opposite apertures formed in said other coupling member and opening into said reservoir, said bimetallic member having an elongated configuration and extending between said apertures and movable between an open position enabling fluid to flow through said apertures and a closed position blocking a flow of fluid through said apertures in response to variations in the temperature of the fluid shear medium in said reservoir.

4. A fluid coupling as set forth in claim 1 wherein said outer surface is a radially outer peripheral surface of said other member and said bi-metallic means includes a strip of bi-metallic material secured at a first end portion to said radially outer peripheral surface of said coupling member, a second end portion of said strip of bi-metallic material being movable in a generally radially outward direction from said radially outer peripheral surface in response to a decrease in the temperature of the fluid shear medium in said shear space to effect an increase in fluid pressure in said shear space adjacent to an open end of said passage means by engagement of the fluid shear medium in said shear space with said second end of said bi-metallic strip to thereby direct a portion of the fluid shear medium into said passage means.

5. A fluid coupling comprising rotatable input and output coupling members, one of said coupling members defining a working chamber in which the other of said coupling members is rotatable, said other coupling member defining a reservoir for holding a fluid shear medium, said coupling members having spaced apart opposed surfaces defining therebetween a shear space and cooperable with fluid shear medium in said shear space to provide a fluid shear-type drive between said coupling members, conduit means for connecting said reservoir in fluid communication with said shear space, a bi-metallic member mounted on said other coupling member and located at least partially within said reservoir for regulating a flow of fluid shear medium from said reservoir through said conduit means to said shear space in response to a condition in said reservoir, passage means extending between an outer surface of said other coupling member and said reservoir for further connecting said reservoir in fluid communication with said shear space, and flow directing means for at least partially regulating a flow of fluid shear medium from said shear space through said passage means to said reservoir, said flow directing means including abutment means formed integrally with said coupling member and projecting in a generally radial direction into said shear space for directing fluid from said shear space into said passage means.

6. A fluid coupling comprising rotatable input and output coupling members, one of said coupling members defining a working chamber in which the other of said coupling members is rotatable, said other coupling member defining a reservoir for holding a fluid shear medium, said coupling members having spaced apart opposed surfaces defining therebetween a shear space and cooperable with fluid shear medium in said shear space to provide a fluid shear-type drive between said coupling members, conduit means for connecting said reservoir in fluid communication with said shear space, a bi-metallic member mounted on said other coupling member and located at least partially within said reservoir for regulating a flow of fluid shear medium from said reservoir through said conduit means to said shear space in response to a condition in said reservoir, passage means extending between an outer surface of said other coupling member and said reservoir for further connecting said reservoir in fluid communication with said shear space, and flow directing means for at least partially regulating a flow of fluid shear medium from said shear space through said passage means to said reservoir, said other coupling member including a radially extending body portion, a peripheral portion and a radially extending flange portion spaced apart from said body portion to form said reservoir, said conduit means including a pair of substantially diametrically spaced apertures formed in said body portion and opening into said reservoir, said bi-metallic member having a generally elongated configuration and extending between said apertures, said body portion of said coupling member including axially outwardly projecting sets of lugs for engaging opposite longitudinally extending sides of said bi-metallic member to position said bimetallic member on said body portion of said coupling member.

7. A fluid coupling comprising a rotatable driving coupling member, a rotatable driven coupling member disposed adjacent to said driving coupling member, said coupling members having spaced opposed surface portions defining a shear space therebetween and cooperable with a fluid shear medium within said shear space to define a shear-type fluid drive between said coupling members, reservoir means formed in said driving coupling member for holding fluid shear medium, conduit means for conducting fluid shear medium between said reservoir and said shear space, condition responsive valve means mounted on said driving coupling member and associated with said conduit means for regulating a flow of fluid from said reservoir through said conduit means to said shear space, passage means extending between a radially outer peripheral surface of said driving coupling member and said reservoir, bi-metallic wiper means mounted on said radially outer peripheral surface of said driving coupling member adjacent to said passage means and movable in a generally radial direction relative to said driving coupling member in response to variations in temperature of the fluid shear medium in said shear space to thereby regulate a flow of said fluid shear medium from said shear space to said reservoir through said passage means.

8. Fluid coupling as set forth in claim 7 wherein said condition responsive valve means includes a bi-metallic member located at least partially in said reservoir and operable to regulate the flow of fluid shear medium through said conduit means in response to variations in the temperature of the fluid shear medium in said reservoir.

References Cited
UNITED STATES PATENTS

| | | | |
|---|---|---|---|
| 2,902,127 | 9/1959 | Hardy | 192—58 |
| 3,259,220 | 7/1966 | Roper | 192—58 |
| 3,262,528 | 7/1966 | Weir | 192—58 |
| 3,339,688 | 9/1967 | Harvey | 192—58 |
| 3,191,733 | 6/1965 | Weir | 192—58 |

BENJAMIN W. WYCHE III, *Primary Examiner.*

U.S. Cl. X.R.

192—82